US012782895B2

(12) United States Patent
Kline et al.

(10) Patent No.: US 12,782,895 B2
(45) Date of Patent: Nov. 3, 2026

(54) SYSTEMS AND METHODS FOR CONFIGURABLE MESSAGE PROCESSING FOR PRODUCT MANUFACTURE PROCESSES PERFORMED THROUGH A MANUFACTURING FACILITY

(71) Applicant: Siemens Industry Software Inc., Plano, TX (US)

(72) Inventors: Martin Kline, Glen Allen, VA (US); Wesley Scott, Charlotte, NC (US)

(73) Assignee: Siemens Industry Software Inc., Plano, TX (US)

( * ) Notice: Subject to any disclaimer, the term of this patent is extended or adjusted under 35 U.S.C. 154(b) by 271 days.

(21) Appl. No.: 18/555,069

(22) PCT Filed: Apr. 29, 2021

(86) PCT No.: PCT/US2021/029865
§ 371 (c)(1),
(2) Date: Oct. 12, 2023

(87) PCT Pub. No.: WO2022/231592
PCT Pub. Date: Nov. 3, 2022

(65) Prior Publication Data
US 2024/0201643 A1 Jun. 20, 2024

(51) Int. Cl.
*G05B 15/02* (2006.01)

(52) U.S. Cl.
CPC .................................... *G05B 15/02* (2013.01)

(58) Field of Classification Search
CPC ...................................................... G05B 15/02
USPC .............................................................. 700/2
See application file for complete search history.

(56) References Cited

U.S. PATENT DOCUMENTS

| | | | | |
|---|---|---|---|---|
| 8,108,470 | B2 * | 1/2012 | Lai | H04L 51/214 700/121 |
| 9,588,503 | B2 * | 3/2017 | Cooper | G06F 3/067 |
| 9,942,145 | B2 * | 4/2018 | Yang | H04L 45/745 |
| 2004/0230989 | A1 | 11/2004 | Macey et al. | |
| 2006/0020666 | A1 | 1/2006 | Lai | |
| 2007/0078555 | A1 * | 4/2007 | Dorgelo | G05B 15/02 700/108 |
| 2007/0179650 | A1 | 8/2007 | Rosenbaum et al. | |
| 2013/0123964 | A1 | 5/2013 | Cooper et al. | |
| 2017/0026288 | A1 | 1/2017 | Yang et al. | |
| 2018/0113979 | A1 * | 4/2018 | McCondochie | G06F 9/5061 |

FOREIGN PATENT DOCUMENTS

| | | |
|---|---|---|
| CN | 101201625 A | 6/2008 |

* cited by examiner

*Primary Examiner* — Md Azad

(57) ABSTRACT

A computing system may include physical devices of a manufacturing facility and a message processing engine. The message processing engine may be configured to receive, from the physical devices of the manufacturing facility, update messages for product manufacture processes performed by the manufacturing facility and parse the update messages to determine a value of a promoted attribute for each of the update messages. The message processing engine may also be configured to group the update messages into different message groups according to the determined value of the promoted attribute and sequentially process update messages grouped into a particular message group for a particular value of the promoted attribute.

14 Claims, 5 Drawing Sheets

SYSTEMS AND METHODS FOR CONFIGURABLE MESSAGE PROCESSING FOR PRODUCT MANUFACTURE PROCESSES PERFORMED THROUGH A MANUFACTURING FACILITY

BACKGROUND

Computer systems can be used to create, use, and manage data for products and other items. Computer-aided technology (CAx) systems, for instance, may be used to aid in the design, analysis, simulation, or manufacture of products. Examples of CAx systems include computer-aided design (CAD) systems, computer-aided engineering (CAE) systems, visualization and computer-aided manufacturing (CAM) systems, manufacturing operations management (MOM) systems, product data management (PDM) systems, product lifecycle management (PLM) systems, and more. CAx systems may include components (e.g., CAx applications) that facilitate the design, simulated testing, and management of product structures and product manufacturing.

BRIEF DESCRIPTION OF THE DRAWINGS

Certain examples are described in the following detailed description and in reference to the drawings.

DETAILED DESCRIPTION

Figure 1:
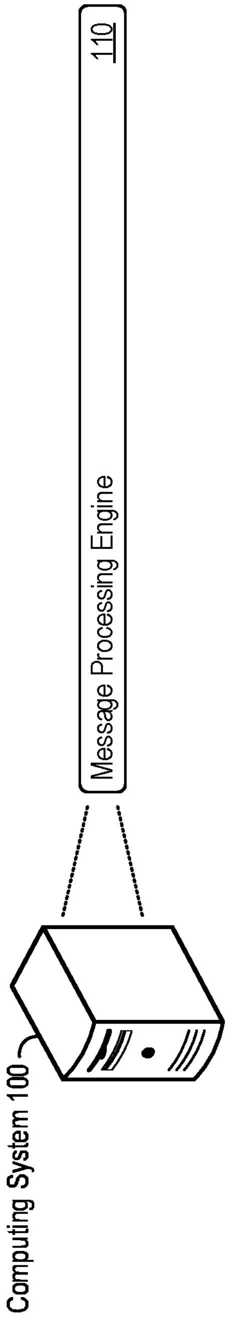
FIG. 1 shows an example of a computing system that supports configurable message processing according to the present disclosure.

Modern product design lifecycles and manufacture processes can be incredibly complex. As technology continues to improve, manufacturing processes to physically produce products can involve multiple different components and systems, ranging from physical devices of manufacturing facilities that physically produce a part, scheduling and execution systems that control the timing and activity of physical devices and manufacturing lines, product management systems that govern the specific product features included in manufactured good, supply chain and distribution systems, quality verification systems, and many more. In such complex environments, exchange of product data between disparate systems can be challenging, especially as different systems associated with product manufacture may only be capable of recognizing, consuming, and processing limited or specific types of product data related to the product manufacture process.

Moreover, different products can be manufactured, verified, and tracked in distinct and customized ways, even for different versions of the same product type. Customized workflows may be required for each different product version in order to properly process communicated product data, and such customizations can involve significant amounts of manual configurations and setup to ensure product manufacture, tracking, and verification processes are properly performed. As these disparate systems associated with product manufacture may process product data differently based on a particular product version, processing sequences for product data may need to be specifically configured between such systems in order to appropriately manage the manufacture of such products.

Customizable modifications, transformations, routing, persistence, and other forms of processing of product data (and messages that communicate such product data) may be required by modern computing systems, including PDM, PLM, and MOM systems to name a few. Conventional message workflow applications may lack the ability to efficiently customize message processing workflows (also referred to as message workflows), as generic tools may not include the specific message processing capabilities and understanding of modern manufacturing processes required to support the complex message interchanges and message processing prevalent in modern product manufacture processes. Moreover, conventional messaging systems can lack visibility into message workflows, provide little support or portability for custom or vendor-specific steps for message workflows, and generally fail to provide the necessary capabilities to support management of modern manufacturing processes.

The disclosure herein may provide systems, methods, devices, and logic for configurable message processing, including for the various systems involved in product manufacture processes. As described in greater detail herein, configurable message processing technology may support capabilities to access, parse, and process messages communicated by devices and systems associated with product manufacture processes. The configurable message processing technology described herein may provide increased customization, visibility, and portability as compared to conventional systems, allowing for processing of messages from manufacturing facilities and product manufacture processes with increased efficiency and configurability. For example, the configurable message processing technology described herein may support customized processing of messages based on any number of promoted attributes, allowing grouping and sequential processing of messages based on a particular message field, data value, or message element.

Additionally or alternatively, the configurable message processing technology described herein may provide metadata-based customization of message workflows, which may support customized message verification, processing, or execution sequences in processing messages exchanged for product manufacture processes. Steps in a message workflow may be exposed as plugins with associated metadata. Doing so may support seamless and portable integration into existing, "out-of-the-box", base workflows, or any other preconfigured message workflows. Through such features and more, the configurable messaging technology described herein may improve the speed, efficiency, and portability in processing messages communicated across complex manufacturing environments that include multiple distinct systems.

These and other configurable message processing features and technical benefits are described in greater detail herein.

FIG. 1 shows an example of a computing system 100 that supports configurable message processing according to the present disclosure. The computing system 100 may take the form of a single or multiple computing devices such as application servers, compute nodes, desktop or laptop computers, smart phones or other mobile devices, tablet devices, embedded controllers, and more. In some implementations, the computing system 100 hosts, supports, executes, or implements a PDM, PLM, or MOM application that can manage or process messages communicated in product manufacture processes.

As an example implementation to support any combination of the configurable message processing features described herein, the computing system 100 shown in FIG. 1 includes a message processing engine 110. The computing system 100 may implement the message processing engine 110 (including components thereof) in various ways, for example as hardware and programming. The programming for the message processing engine 110 may take the form of processor-executable instructions stored on a non-transitory machine-readable storage medium and the hardware for the message processing engine 110 may include a processor to execute those instructions. A processor may take the form of single processor or multi-processor systems, and in some examples, the computing system 100 implements multiple engines, components, elements, or other logical entities using the same computing system features or hardware components (e.g., a common processor or a common storage medium).

In operation, the message processing engine 110 may receive, from physical devices of a manufacturing facility, update messages for product manufacture processes performed through the manufacturing facility as well as parse the update messages to determine a value of a promoted attribute for each of the update messages. In operation, the message processing engine 110 may also group the update messages into different message groups according to the determined value of the promoted attribute and sequentially process update messages grouped into a particular message group for a particular value of the promoted attribute.

These and other configurable message processing features are described in greater detail next. Many of the examples presented herein relate to message exchanges and processing in the context of manufacturing operations, though the disclosure is not so limited. The configurable message processing technology presented herein may be consistently applied to any appropriate context in which messages and message workflows require configurable or customized processing sequences.

Figure 2:
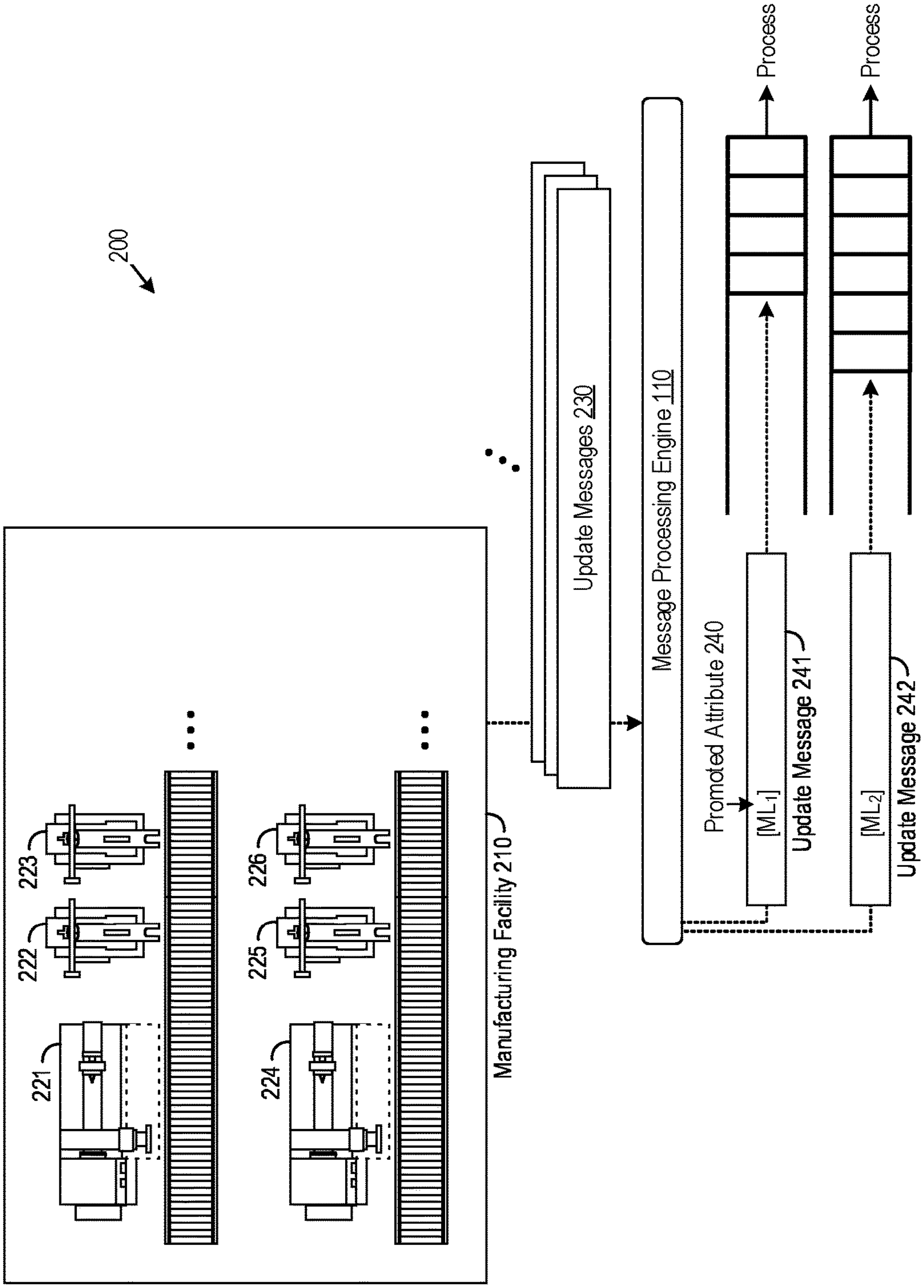
FIG. 2 shows an example of a system that supports message processing based on a promoted attribute.

FIG. 2 shows an example of a system 200 that supports message processing based on a promoted attribute. In the example of FIG. 2, the system 200 includes a manufacturing facility 210. The manufacturing facility 210 may be any physical location, facility, or space at which product manufacturing of any type occurs. Modern manufacturing facilities may vary in design, complexity, or size based on the particular product manufacture processes performed or otherwise supported by a manufacturing facility, and many manufacturing facilities may include any number of physical devices to support product manufacture. As used herein, physical devices may include any device that performs or supports a product manufacture process. Example physical devices of manufacturing facilities can include composite layup tools, robotic machinery, manufacturing and assembly lines, programmable logic controllers, silicon fabrication tools, additive manufacturing machinery or 3D printers, and other physical devices of any type, complexity, structure, or composition. Physical devices may also include communication components in order to communicate product data to different entities involved or associated with the product manufacture process.

In the example of FIG. 2, the manufacturing facility 210 includes two different manufacturing lines, with physical devices 221-223 as part of a first manufacturing line and physical devices 224-226 as part of a second manufacturing line. The physical devices 221-223 of the first manufacturing line and the physical devices 224-226 of the second manufacturing line may include similar or identical machinery, and may manufacture different instances, lots, or batches of the same product. Additionally or alternatively, the different manufacturing lines of the manufacturing facility 210 may support or perform product manufacture processes of different products or product types. As part of product manufacture processes, the physical devices 221-226 may communicate product data associated with the product manufacture processes, for example to provide status updates on manufacturing checkpoints, collected sensor data, results of performed verification analyses, or with regards to any other aspect of the product manufacture processes supported by the manufacturing facility 210.

In some examples, execution or scheduling systems can control operation of the physical devices 221-226. Such execution or scheduling systems may include timing or control logic that, for example, controls the precision and timing of robotic actions performed by the physical devices 221-226 in manufacturing products along the manufacturing lines of the manufacturing facility 210. Other systems may also be involved in the product manufacture processes supported by the manufacturing facility 210, such as supply chain systems, PDM and PLM systems, and various other entities that may exchange communications related to the product manufacture processes performed through the manufacturing facility 210. Product data may be communicated among such systems through update messages (also referred to herein as messages), which may include any communication that includes product data related to a product manufacture processes. Product data may include information relevant to the product itself (e.g., a batch number, a physical orientation of a product in the manufacturing line, the current status of the product, etc.) or information for any component, element, or entity involved in the product manufacture process (e.g., orientation or angle of the physical devices 221-226, melt pool width of a 3D printer used to construct physical products, sensor readings or status, and more).

The various entities that exchange product data related to product manufacture processes supported by the manufacturing facility 210 may be disparate and distinct, often times requiring, consuming, or providing limited, specific, or particular types of product data related to product manufacture. For example, the physical devices 221-226 may provide data relevant to the specific manufacturing step performed by the physical devices 221-226, but may lack any visibility or insight into any other aspects of the product manufacture process. As one example, the physical device 221 may send update messages as to the width of silicon wafer being fabricated on a first manufacturing line, but have no insight or access to other product data for the silicon wafer such as product lot tracking numbers, distribution timelines, subsequent fabrication steps, or other state-specific data relevant to the wafer fabrication process. Moreover, as the particular product(s) or product type(s) being manufactured at the manufacturing facility 210 may require customized manufacturing steps, verification, and distribution processes, product data and messages exchanged for these different entities may require customized and specific execution workflows.

The message processing engine 110 may process any messages associated with product manufacture processes supported by the manufacturing facility 210, and may support configurable message processing and distinct workflows according to any differentiating parameter or criteria.

In some implementations, the message processing engine 110 may serve as a message broker between any of the different systems involved or related to product manufacture processes supported by the manufacturing facility 210, and may oversee communication of relevant product data to these different systems in a manner and format specifically supported or otherwise required by these different systems. To support such exchanges of product data, the message processing engine 110 may maintain a fuller or more complete view of product manufacturing and product states as compared to the disparate systems in order to appropriately communicate with the different systems as required.

To support configurability between different product types or different instances of the same product type, the message processing engine 110 may process messages based on promoted attributes. A promoted attribute may refer to any parameter, aspect, element, or characteristic of messages exchanged for product manufacture processes. The message processing engine 110 can group, sort, or batch messages received by the message processing engine 110 according to a single or multiple promoted attributes. In that regard, the message processing engine 110 may differentiate between product data provided by a manufacturing facility based on the promoted attribute, and promoted attributes may be specified through user specification (e.g., user input), system configurations, or as predetermined default attributes. Through such grouping or sorting, the message processing engine 110 may support differentiated or separate processing streams for messages generated by the manufacturing facility 210, which may allow for configured and separate execution sequences and message processing workflows between different product types, different instances of a the same product, or combinations thereof.

To illustrate through the example in FIG. 2, the manufacturing facility 210 may send update messages 230 to the message processing engine 110 and the update messages 230 may relate to product manufacture processes performed or supported by the manufacturing facility 210. For instance, the updates messages 230 may be generated and sent by the physical devices 221-226 and provide status updates of actions or other manufacturing activity respectively performed by the physical devices 221-226. As an example, an update message generated by the physical device 221 may indicate that a silicon wafer has been added to the first manufacturing line and another update message generated by the physical device 222 may indicate that the silicon wafer has been rotated into a specific angular position as part of a wafer fabrication process. Update messages may communicate any type of product data relevant to product manufacture processes performed through the manufacturing facility 210.

Note that update messages generated by the physical devices 221-226 may be relatively simple or lack context as to a broader state of products manufactured through the physical devices 221-226. This may be the case as the physical devices of manufacturing facilities may be designed to provide lightweight or concise updates as to manufacturing activity performed by such devices. Absent in such update messages may be any explicit mechanism or data to track, correlate, or otherwise relate activities between the physical devices or otherwise different products being manufactured through such physical devices, as physical devices of manufacturing facility are not designed to maintain a comprehensive view of product manufacture processes.

The message processing engine 110 may differentiate between different products and product types via promoted attributes, and may support state tracking and configurable workflows through such differentiations. In the example shown in FIG. 2, the message processing engine 110 sorts the update messages 230 into different groups based on a promoted attribute included in the update messages 230. In supporting such grouping, the message processing engine 110 may parse the update messages 230 to determine a value of the promoted attribute for each of the update messages 230 and then group the update messages 230 into different message groups according to the determined value of the promoted attribute. Then, the message processing engine 110 may process different groups of messages in distinct message workflows, e.g., by sequentially processing update messages grouped into a particular message group for a particular value of the promoted attribute and separately processing another message group.

In the example of FIG. 2, the message processing engine 110 groups the update messages 230 based on a promoted attribute 240 shown in FIG. 2. In some examples, the promoted attribute 240 utilized by the message processing engine 110 can be a manufacturing line attribute included in update messages 230 provided by physical devices 221-226 of the manufacturing facility 210. Thus, the message processing engine 110 may differentiate or group update messages based on manufacturing line. Other examples of promoted attributes include groups of device IDs, batch IDs, time stamp ranges, any other data field included in the update messages 230 provided by the physical devices 221-226 of the manufacturing facility 210. In manufacturing line examples, the message processing engine 110 may group the update messages 230 into different message groups based on a manufacturing line of the manufacturing facility 210 that the update messages 230 are sent from. Thus, update messages sent from physical devices 221-223 of a first manufacturing line may be sorted into a first message group by the message processing engine 110 and update messages sent from the physical devices 224-226 of a second manufacturing line may be grouped into a different message group (e.g., a second message group). The message processing engine 110 may distinctly process the messages sorted into the different message groups, for example sequentially based on timestamps, but in two distinct and separate processing streams.

The message processing engine 110 may process the first and second message groups separately (and, in some examples, in parallel). Processing of a messages in a given message group may be controlled via message workflows, and the message workflow may specify the specific steps, actions, and processing to be performed for a set of messages grouped into a given message group. Example features of message processing according to configurable message workflows are described next with reference to FIG. 3.

Figure 3:
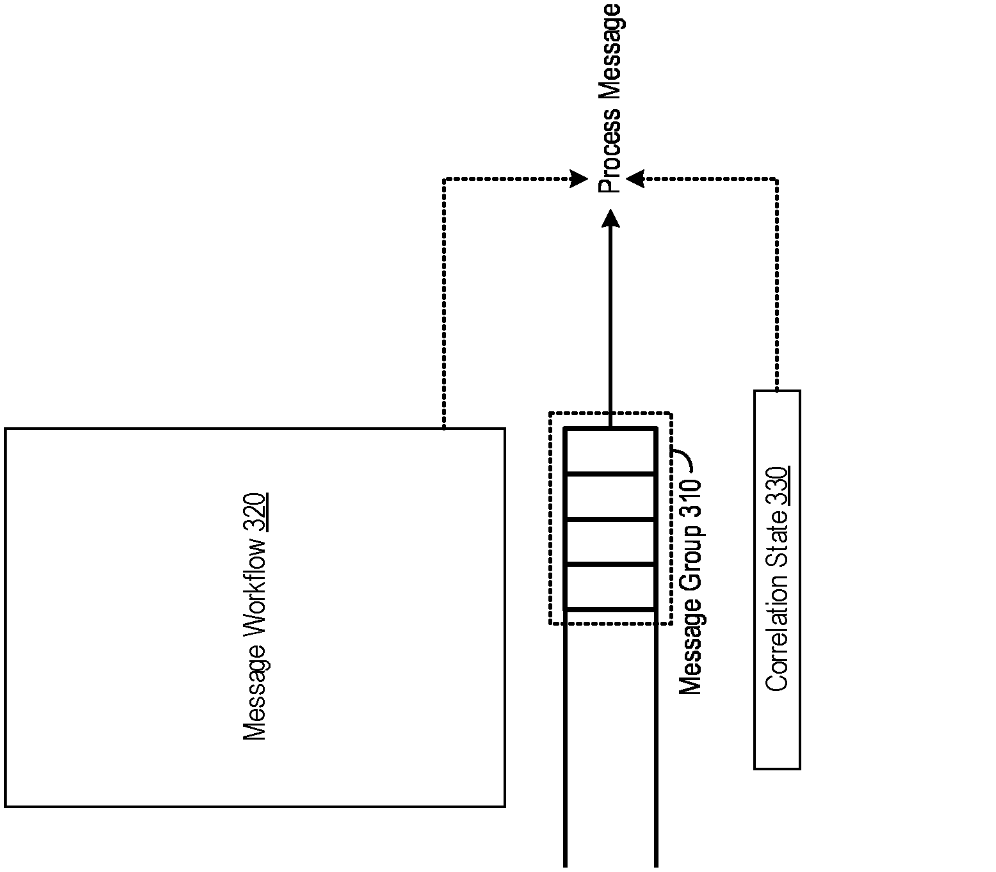
FIG. 3 shows an example of message processing for a message group via a message workflow.

FIG. 3 shows an example of message processing for a message group via a message workflow. The message processing of FIG. 3 is described via the message processing engine 110, though any number of implementations are contemplated herein. In the example of FIG. 3, the message processing engine 110 processes messages grouped into a message group 310, and may do as specified based on a message workflow 320.

The message workflow 320 may refer to any sequence of steps to perform for processing messages, and the message processing engine 110 may support access and utilization of message workflows of any format. In that regard, the message workflow 320 may govern the specific processing actions to take in processing the messages included in the message group 310. For example, sequential execution of messages in the message group 310 according to message timestamps may specify the specific action sequence, logic, and ordering of processing steps to perform for the messages of the message group 310. In some examples, the message processing engine 110 may maintain the message workflow as a JavaScript Object Notation (JSON) document, an extensible Markup Language (XML) document, or in any other suitable data format.

In processing the messages of the message group 310, the message processing engine 110 may maintain a correlation state 330 for the message group. The correlation state 330 may track any state data relevant to the message group 310 (or a given product that is being manufactured as tracked through product data included in the message group 310). The correlation state 330 may thus include state data of particular product in a manufacturing process tracked and correlated together via the messages in the message group 310. Steps in the message workflow 320 may be specifically tailored for the particular product, and steps in the message workflow 320 may vary depending on characteristics of or a current state of the correlation state 330 tracked for the message group 310 by the message processing engine 110. For instance, verification failures, machinery thresholds, or any other relevant product manufacturing updates may affect the correlation state 330, the message workflow 320 may condition performance of specific steps based on states reached in the correlation state 330.

To process messages of the message group 310, the message processing engine 110 may instantiate separate message execution instances, which may refer to any separate instance of logic, hardware, or processing element configured to process a message. Execution instances may resolve, e.g., at run-time, the specific actions (e.g., steps of the message workflow 320) to be performed for a given message being processed by the execution instance. Such resolution may be based on steps delineated in the message workflow 320, properties (e.g., data values) of the given message being processed, or a combination of both. In some implementations, a given execution instance processes a single message, and may receive the message as well as any relevant state values of the correlation state 330 for the determined actions to perform for the message. Upon processing the message based on the determined actions, execution instances may return the processed message along with any state modifications to the correlation state 330 (e.g., state value updates, deletions, or additions).

The message processing engine 110 may itself host, instantiate, or otherwise implement execution instances to process messages of the message group 310. The message processing engine 110 may host the execution instances during run-time and manage execution instance lifecycles, for example by determining a correlation state ID for messages of the message group 310 (e.g., which may be consistent with or equal to an ID for the message group 310), identifying relevant state values of the correlation state 330 to pass to the execution instances, receiving processed messages, and updating the correlation state 330 based on the message processing by the execution instances. Accordingly, for processed messages of the message group 310, the message processing engine 110 may update the correlation state 330, doing so as part of the sequential processing of the update messages grouped into the message group 310.

Responsive to a determination that the correlation state 330 for the message group 310 reaches any number of predetermined points, the message processing engine 110 may perform any number of configurable actions in support of product manufacture. Such conditional actions may be in addition to specific message processing steps specified in the message workflow 320. For instance, the message processing engine 110 may delete the correlation state 330 in response to determining that a product manufacture process for the particular message group has completed (e.g., the correlation state 330 has reached a final state). As another example, the message processing engine 110 may send a state notification to a manufacturing scheduling system responsive to a determination that the correlation state 330 has reach a certain state, and the manufacturing scheduling system may be configured to control execution schedules for the physical devices 221, 222, 223, 224, 225, 226 of the manufacturing facility 210.

In any manner as described herein, the message processing engine 110 may support or process messages of a different message groups determined for messages received by the message processing engine 110. Each different message group may be assigned to a separate and distinct executed sequence managed by the message processing engine 110, and different execution sequences may be performed by the message processing engine 110 according to the same message workflow (e.g., for manufacturing lines manufacturing different instances of the same product) or different message workflows (e.g., for manufacturing lines manufacturing different products). The various message workflows accessed and utilized by the message processing engine 110 for such execution sequences may be configurable and customized for specific product manufacture processes. The message processing engine 110 may support any number of customization capabilities such that message flows and execution sequences for message groups are configurable on a per-product basis.

To support configurability of message workflows by which the message processing engine 110 processes grouped messages, the configurable message processing technology described herein may support configurable message workflows that can be customized into specific steps as specified based on requirements and actions correlated to product manufacture processes, product-specific requirements, vendor-specific processes, and the like. As such, the message processing engine 110 may support any number of customization capabilities and environments by which users can specify, visualize, test, or modify steps of a message workflow, for example through a graphical development environment.

In some implementations, steps in a message workflow can be implemented as exposed plug-ins. Each step (e.g., plug-in) can expose the same software interface, and the message processing engine 110 may discover, instantiate, resolve, or otherwise identify each step as needed, e.g., during initialization. In some implementations, each plugin exposes metadata that governs its configuration. Exposed metadata for message workflow steps can include how the step is stored (e.g., JSON format), how the step is retrieved, how the step is validated (e.g., certain validation sequences, operations, or actions), and how a step is displayed to the user via application graphical user interfaces (GUIs) for viewing, testing, or editing message workflow. In some examples, exposed metadata for message workflow steps can include information that provides decision support such as validation logic, selection values, conditional branching of action sequences, and more.

Standard workflow steps can be provided by the message processing engine 110 as "out-of-the-box" or default steps that are supported and readily available for customizations or modifications to new or existing message workflows. Customized steps can also be created (e.g., vendor or client-specific steps or workflows components), which the message processing engine 110 can seamlessly integrate and visualize in graphical development environments as exposed metadata of the customized steps may allow for consistent identification, instantiation, and visualization as with the default "out-of-the-box" steps already supported by the message processing engine 110. Through such customization and metadata-driven visualization and consistency, the configurable message processing technology described herein may increase the useability, flexibility, and portability of message workflows designed on a per-product or per-manufacturing process basis.

Figure 4:
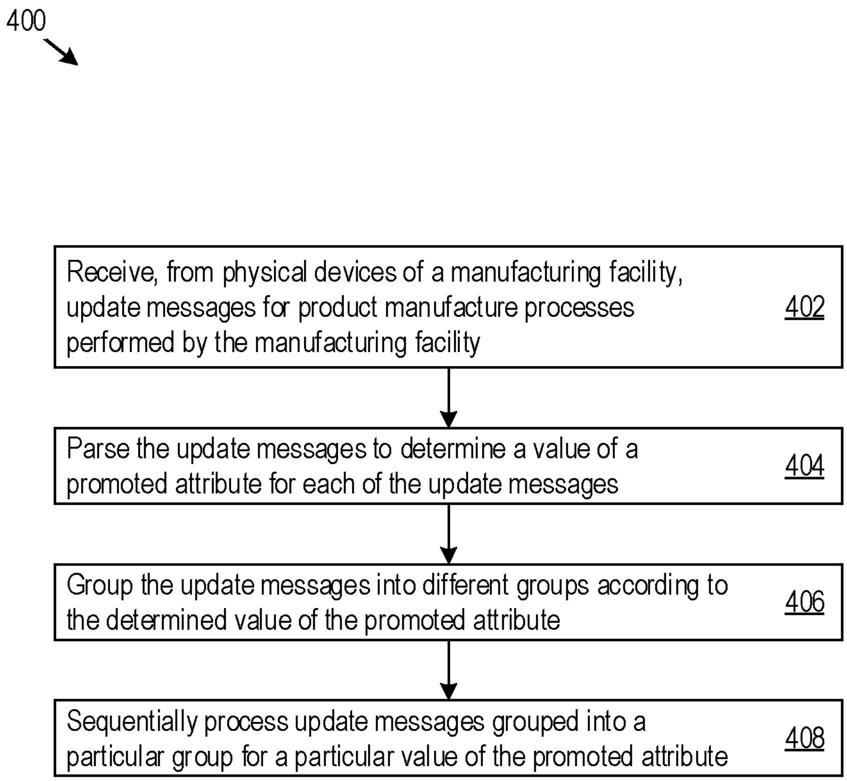
FIG. 4 shows an example of logic that a system may implement to support configurable message processing.

FIG. 4 shows an example of logic 400 that a system may implement to support configurable message processing. For example, the computing system 100 may implement the logic 400 as hardware, executable instructions stored on a machine-readable medium, or as a combination of both. The computing system 100 may implement the logic 400 via the message processing engine 110, through which the computing system 100 may perform or execute the logic 400 as a method to implement various configurable message processing features described herein. The following description of the logic 400 is provided using the message processing engine 110 as an example. However, various other implementation options by computing systems are possible.

In implementing the logic 400, the message processing engine 110 may receive, from physical devices of a manufacturing facility, update messages for product manufacture processes performed through the manufacturing facility (402) as well as parse the update messages to determine a value of a promoted attribute for each of the update messages (404). In implementing the logic 400, the message processing engine 110 may also group the update messages into different message groups according to the determined value of the promoted attribute (406) and sequentially process update messages grouped into a particular message group for a particular value of the promoted attribute (408). The message processing engine 110 may process update messages grouped into a different message group from the particular message group in parallel with the sequential processing of the update messages grouped into the particular message group.

The logic 400 shown in FIG. 4 provides an illustrative example by which a computing system 100 may support configurable message processing according to the present disclosure. Additional or alternative steps in the logic 400 are contemplated herein, including according to any of the various features of the configurable message processing technology described herein.

Figure 5:
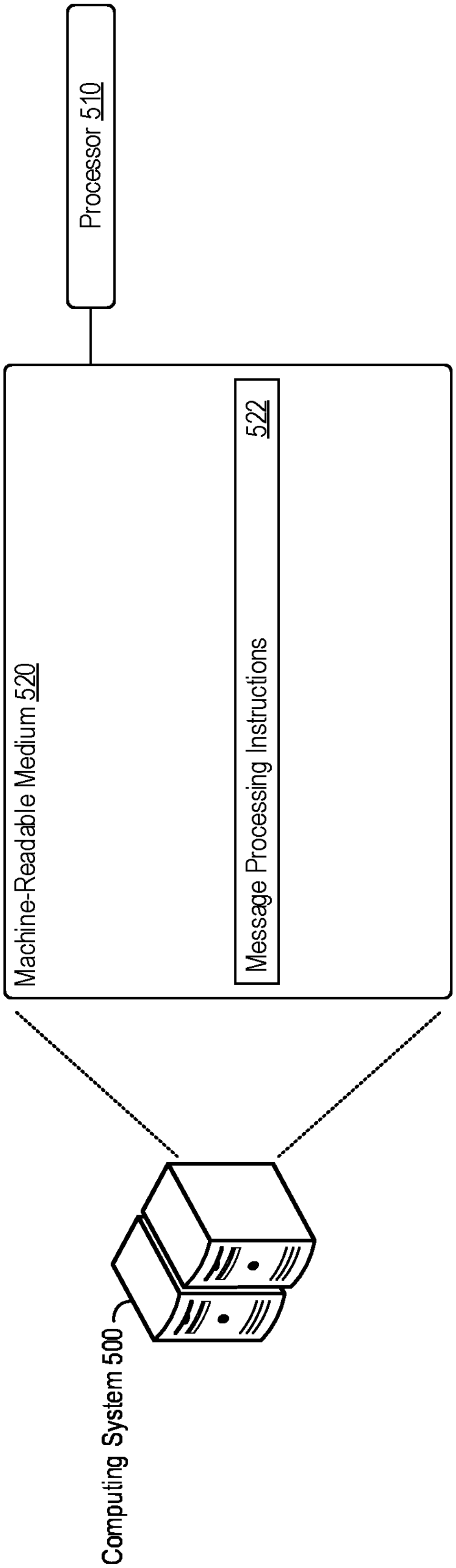
FIG. 5 shows an example of a computing system that supports configurable message processing according to the present disclosure.

FIG. 5 shows an example of a computing system 500 that supports configurable message processing according to the present disclosure. The computing system 500 may include a processor 510, which may take the form of a single or multiple processors. The processor(s) 510 may include a central processing unit (CPU), microprocessor, or any hardware device suitable for executing instructions stored on a machine-readable medium. The computing system 500 may include a machine-readable medium 520. The machine-readable medium 520 may take the form of any non-transitory electronic, magnetic, optical, or other physical storage device that stores executable instructions, such as the message processing instructions 522 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 500 may execute instructions stored on the machine-readable medium 520 through the processor 510. Executing the instructions (e.g., the message processing instructions 522) may cause the computing system 500 to perform any of the configurable message processing features described herein, including according to any of the features of the message processing engine 110.

For example, execution of the message processing instructions 522 by the processor 510 may cause the computing system 500 to receive, from physical devices of a manufacturing facility, update messages for product manufacture processes performed through the manufacturing facility and parse the update messages to determine a value of a promoted attribute for each of the update messages. Execution of the message processing instructions 522 by the processor 510 may further cause the computing system 500 to group the update messages into different message groups according to the determined value of the promoted attribute and sequentially process update messages grouped into a particular message group for a particular value of the promoted attribute.

Any additional or alternative features of the configurable message processing technology described herein may be implemented via the message processing instructions 522.

The systems, methods, devices, and logic described above, including the message processing engine 110, may be implemented in many different ways in many different combinations of hardware, logic, circuitry, and executable instructions stored on a machine-readable medium. For example, the message processing engine 110 may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the message processing engine 110.

The processing capability of the systems, devices, and engines described herein, including the message processing engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:

by a computing system:

receiving, from physical devices of a manufacturing facility, update messages for product manufacture processes performed through the manufacturing facility;

parsing the update messages to determine a value of a promoted attribute for each of the update messages;

grouping the update messages into different message groups according to the determined value of the promoted attribute;

sequentially processing update messages grouped into a particular message group for a particular value of the promoted attribute;

maintaining a correlation state for the particular message group;

updating the correlation state as part of the sequential processing of the update messages grouped into the particular message group; and sending a state notification to manufacturing scheduling system responsive to a determination that the correlation state has reached a certain state, wherein the manufacturing scheduling system is configured to control execution schedules for the physical devices of the manufacturing facility.

2. The method of claim 1, wherein the promoted attribute is a manufacturing line attribute included in the update messages, and wherein grouping the update messages comprises grouping the update messages into the different message groups based on a manufacturing line of the manufacturing facility that the update messages are sent from.

3. The method of claim 1, further comprising processing update messages grouped into a different message group from the particular message group in parallel with the sequential processing of the update messages grouped into the particular message group.

4. The method of claim 1, further comprising deleting the correlation state in response to determining that a product manufacture process for the particular message group has completed.

5. The method of claim 1, further comprising setting a given attribute included in the update messages as the promoted attribute based on a user specification, a system configuration, or a predetermined default attribute.

6. A system comprising:

physical devices of a manufacturing facility;

a processor; and a non-transitory machine-readable medium comprising instructions that, when executed by the processor, cause a computing system to:

receive, from the physical devices of the manufacturing facility, update messages for product manufacture processes performed through the manufacturing facility;

parse the update messages to determine a value of a promoted attribute for each of the update messages;

group the update messages into different message groups according to the determined value of the promoted attribute;

sequentially process update messages grouped into a particular message group for a particular value of the promoted attribute;

maintain a correlation state for the particular message group; and update the correlation state as part of the sequential processing of the update messages grouped into the particular message group; and send a state notification to manufacturing scheduling system responsive to a determination that the correlation state has reached a certain state, wherein the manufacturing scheduling system is configured to control execution schedules for the physical devices of the manufacturing facility.

7. The system of claim 6, wherein the promoted attribute is a manufacturing line attribute included in the update messages, and wherein the instructions, when executed, cause the computing system to group the update messages by grouping the update messages into the different message groups based on a manufacturing line of the manufacturing facility that the update messages are sent from.

8. The system of claim 6, wherein the instructions, when executed, further cause the computing system to process update messages grouped into a different message group from the particular message group in parallel with the sequential processing of the update messages grouped into the particular message group.

9. The system of claim 6, wherein the instructions, when executed, further cause the computing system to delete the correlation state in response to determining that a product manufacture process for the particular message group has completed.

10. The system of claim 6, wherein the instructions, when executed, further cause the computing system to set a given attribute included in the update messages as the promoted attribute based on a user specification, a system configuration, or a predetermined default attribute.

11. A non-transitory machine-readable medium comprising instructions that, when executed by a processor, cause a computing system to:

receive, from the physical devices of the manufacturing facility, update messages for product manufacture processes performed through the manufacturing facility;

parse the update messages to determine a value of a promoted attribute for each of the update messages;

group the update messages into different message groups according to the determined value of the promoted attribute;

sequentially process update messages grouped into a particular message group for a particular value of the promoted attribute;

maintain a correlation state for the particular message group;

update the correlation state as part of the sequential processing of the update messages grouped into the particular message group; and send a state notification to manufacturing scheduling system responsive to a determination that the correlation state has reached a certain state, wherein the manufacturing scheduling system is configured to control execution schedules for the physical devices of the manufacturing facility.

12. The non-transitory machine-readable medium of claim 11, wherein the promoted attribute is a manufacturing line attribute included in the update messages, and wherein the instructions, when executed, cause the computing system to group the update messages by grouping the update messages into the different message groups based on a manufacturing line of the manufacturing facility that the update messages are sent from.

13. The non-transitory machine-readable medium of claim 11, wherein the instructions, when executed, further cause the computing system to process update messages grouped into a different message group from the particular message group in parallel with the sequential processing of the update messages grouped into the particular message group.

14. The non-transitory machine-readable medium of claim 11, wherein the instructions, when executed, further cause the computing system to delete the correlation state in response to determining that a product manufacture process for the particular message group has completed.

* * * * *